United States Patent [19]
Lindsay

[11] Patent Number: 5,474,298
[45] Date of Patent: Dec. 12, 1995

[54] GOLF SWING ANALYSING APPARATUS

[76] Inventor: Norman M. Lindsay, 19 Batchelors Way, Amersham, Bucks HP7 9AH, United Kingdom

[21] Appl. No.: 167,815

[22] PCT Filed: Jun. 18, 1992

[86] PCT No.: PCT/GB92/01105

§ 371 Date: Apr. 8, 1994

§ 102(e) Date: Apr. 8, 1994

[87] PCT Pub. No.: WO92/22358

PCT Pub. Date: Dec. 23, 1992

[30] Foreign Application Priority Data

Jun. 18, 1991 [GB] United Kingdom ............... 9113188

[51] Int. Cl.$^6$ ................................................. A63B 69/36
[52] U.S. Cl. ................................. 273/183.1; 273/186.1; 273/195 R
[58] Field of Search .......................... 273/183.1, 186.1, 273/186.2, 35 R, 195 R, 184 R; 434/252

[56] References Cited

U.S. PATENT DOCUMENTS

| | | | |
|---|---|---|---|
| 4,254,956 | 3/1981 | Rusnak | 273/186.1 |
| 4,451,043 | 5/1984 | Ogawa et al. | 273/186.1 |
| 4,615,526 | 10/1986 | Yasuda et al. | 273/186.2 |
| 4,732,390 | 3/1988 | McCollum | 273/186.1 |
| 4,844,469 | 7/1989 | Yasuda et al. | 273/186.1 |
| 4,844,470 | 7/1989 | Hammon et al. | 273/195 R |
| 4,991,850 | 2/1991 | Wilhelm | 273/186.1 |
| 5,108,105 | 4/1992 | Shimizu | 273/186.1 |
| 5,114,150 | 5/1992 | Matsumura | 273/186.1 |

FOREIGN PATENT DOCUMENTS

| | | |
|---|---|---|
| 0111051 | 6/1984 | European Pat. Off. . |
| 291621 | 6/1987 | European Pat. Off. . |
| 0476200 | 3/1992 | European Pat. Off. . |
| 2072519 | 10/1981 | United Kingdom . |
| 2091111 | 7/1982 | United Kingdom . |
| 2096469 | 10/1982 | United Kingdom . |
| 2110544 | 6/1983 | United Kingdom . |
| 2110939 | 6/1983 | United Kingdom . |
| 2113102 | 8/1983 | United Kingdom . |
| 2135199 | 8/1984 | United Kingdom . |
| 2150841 | 7/1985 | United Kingdom . |
| 2154146 | 9/1985 | United Kingdom . |
| 2217995 | 11/1989 | United Kingdom . |
| 2223952 | 4/1990 | United Kingdom . |

OTHER PUBLICATIONS

PCT WO88/09689, publication date: Dec. 1988.
Science Eye HD–01 Book–Bridgestone.
Vac Rare–Earth Permanent Magnet Materials–Jul. 1989 Ed. pp. 1–22.

*Primary Examiner*—Jessica J. Harrison
*Attorney, Agent, or Firm*—Levisohn, Lerner, Berger & Langsam

[57] ABSTRACT

A golf swing analyzing apparatus for detecting, measuring and/or displaying differences from a desired ideal golf swing is described. The apparatus comprises (a) one or two permanent magnets in spaced recess in one or more golf clubs, (b) a number of loops in a planar detector array close to the notional or actual ball position and (c) a readout device for picking up the various signals created as the magnets cross straight line portions of the loops and conveying them to indications of swing angle, club face angle, club face tilt, impact zone at the club face, speed acceleration, rake and so on. The magnitudes of speed, height sensitivity, and magnet strength permit such golf diagnostic equipment to be readily constructed and give usable displays of figures of (on a screen) outcome of the notional golf stroke.

53 Claims, 6 Drawing Sheets

D2>>D1

GOLF SWING ANALYSING APPARATUS

BACKGROUND OF THE INVENTION

1. Field of the Invention

This invention relates to apparatus for detecting measuring and/or displaying differences from the desired ideal performance characteristics of a golf swing. The apparatus may be used to track the motion and orientation of the clubhead during the execution of a golf swing.

2. Description of the Prior Art

Several forms of such apparatus are known. In one known type of apparatus the position and orientation of the clubhead during a golf swing is sensed by an array of narrow beam electro-optical sensors. In a typical array, two parallel rows of closely spaced electro-optical sensors are mounted at ground level behind the initial tee position of a golf ball. The two rows of electro-optical sensors are perpendicular to the straight swing path that is the nominally correct, undeviated line of swing. One row of the electro-optical sensors is set slightly behind the tee position, and the other row of electro-optical sensors is set a further distance behind, the separation of the two rows being by some known distance. The clubhead swing trajectory starts from behind the tee position and, during a golf swing, an electrical signal change is generated in any given electro-optical sensor circuit when the clubhead passes vertically above the electro-optical sensor. By monitoring all of the electrical signals from the array, the position and inclination of the clubhead as it sweeps above each row can be computed. From this, the angle of swing, the skewness of the clubhead and its offset from centre can be computed. The speed of the clubhead, averaged across the sensor zones, can also be computed, this being proportional to the row separation and to the inverse of the time taken by the clubhead to traverse the two rows, assuming small swing angle deviations from the normal.

The above mentioned known apparatus suffers from the disadvantage that a large number of the electro-optical sensors is required because a large number of discrete points are monitored. This in turn leads to increased manufacturing costs and complexity of equipment.

Another type of apparatus depends upon magnetic sensors located in and around the notional impact area and upon their magnetic interaction with the metal of the club head, or in some cases with metal and magnetic inserts specially placed in the club head. Changes in the magnetic fields are picked up at the sensors and can be displayed digitally, or manifested as a diagnostic round or visual signal. Examples of such equipment are described in GB 2135199B, GB 2150841B, GB 2110939B, U.S. Pat. No. 4,844,469, U.S. Pat. No. 4,451,043, GB 2217995A and GB 2223952A.

SUMMARY OF THE INVENTION

All of the above known types of magnetic-field sensing equipment are based upon the use of localised, individual sensors of small area. The present invention is based upon the realisation that the use of a totally different configuration of magnetic field sensor units, not localised as a number or array of small areas, gives greater sensitivities and accuracies, especially in respect of the signal strength and type responsive to height of the club head, and that this leads to a wider range of measurement capabilities in addition to greater sensitivities on the basic directional assessments.

It is an aim of the present invention to provide apparatus for sensing and/or measuring the travel of a clubhead of a golf club, which apparatus has inherently increased sensitivities of detection and measurement compared to those of the prior art.

In one aspect the invention consists in apparatus for detecting differences from desired ideal performance characteristics of a golf swing, comprising: at least one golf club having attached in relation to the club head at least one permanent magnet at a predetermined location and orientation relative to the club face; a detector array having a ball-position indication, and comprising at least one sensor, for a magnetic field, located in a predetermined sensing position relative to the desired ideal path of the club head over the ball position indication; and circuitry electrically connected to the detector array to convert one or more electrical signals produced by said sensor into a signal or signals suitable for indication, measurement or display, and readout means electrically connected to the circuitry to provide an indication, measurement or display of detected differences, characterised in that the sensor is in the form of a magnet-sensitive boundary unit with at least one elongate portion of known configuration in a predetermined location and orientation relative to the said desired ideal path.

The elongate portion of the magnet-sensitive boundary unit is preferably a straight portion. The term 'elongate' is in contradistinction to a small area, a point sensor. In practice, the portion should be elongate enough to intersect a high proportion of the magnetic flux as the magnet moves past the sensor. While the Applicants do not wish to be bound by any discussion of the theory of their invention, it is valuable to intersect at least 50% of the available theoretical maximum flux (i.e. if the sensor were infinitely continued) and possible 80%, 90% or more. The term 'boundary unit' preferably designates a straight length of electrically conductive material such as a straight line portion of a loop. For reasons discussed below, such loop, if of most practical size, should include, as well as the straight line portion, continuing portions extending away in the direction of the desired ideal path, to optimise the signal produced by the sensor. It can however denote the straight narrow gap left between two elongate plates of magnetisable material with parallel spaced edges, in which case a signal is produced as a magnet on a golf club traverses such a plate position, and falls sharply in the gap. Such a signal configuration can be picked up by a magnet sensor beneath and bridging the gap, but the signal is nonetheless generated along a length of material rather than at a point sensor only.

The number of magnets attached in relation to the club head can vary although, since their respective fields should not overlap to the extent that confusion arises, a small number of magnets, specifically one or two magnets, is preferable. These can be fixed at the sole of the club or at the back of the club. If only one magnet is used it will preferably be located in a recess in the sole or at the back of the club in that central plane of the club perpendicular to the club face and the sole i.e. that plane in which a hit ball will generally travel. If two magnets are used they can be spaced fore-and-aft in that plane, again in suitable recesses in the sole. This configuration is more suitable for woods. Alternatively, the magnets can be equispaced to either side of that central plane, in which case it is preferred for the magnets to lie in such recesses at the back but near the sole. This configuration is more suitable for irons or a putter.

The magnets may be held in the recesses with their magnetic axes (referred to herein as "horizontal") in the general direction of ball travel path; or at right angles to this path and generally "vertical" (in relation to a club held at rest on the ground); or possibly even at right angles to the path but still generally "horizontal" (again in relation to the grounded stationary club). Where two magnets are used, and when these are spaced by a predetermined amount e.g. equispaced at the back or in the sole to either side of that central plane discussed above it is preferable to orient them in opposition i.e. with the N poles facing in opposite directions, to give easily distinguishable signals. If two magnets are spaced fore-and-aft in the sole, they can either be opposed or lie in the same direction.

One preferred range of such spacing is usually from 50 mm to 90 mm. For example, magnets in the sole of a wood, or back of an iron, are typically spaced at 60 mm; at the back of a putter 80 mm is preferred.

The magnets used are preferably the so-called "rare-earth-based permanent magnets", which can be fabricated in small sizes with high strengths as measured by their "BH product". The NdFeB type of magnets, said to be approximately $Nd_2Fe_{14}B$, or the socalled "$SECo_5$" magnets, as available under the Registered Trade Marks Vacodym and Vacomax from Vacuumschmelze GmbH of Hanau, Germany, when made up in cylindrical shape, 5–10 mm diameter and 3–10 mm length, e.g. 8 mm diameter and 5 mm length, (the larger sizes are more suitable for putters) and axially magnetised with a BH product measured in $KJ/m^3$ of 50–350, more preferably 200–300, which magnets have a resistance to impact demagnetisation, are valuable in the practice of this invention.

The "sensitive boundary unit" will be discussed in more detail with reference (for convenience) to a straight portion of electrically conductive wire as typical of other configurations.

In its simplest form the detector array may comprise one straight portion of electrically conductive material located to intersect the plane of the desired ideal path, or located parallel to the said path, so as to be intersected by a magnet travel path upon a sufficient departure from the desired ideal.

It preferably however comprises two straight line portions, preferably both arranged so that one or both intersect the plane of the ideal desired path, or of a path of ideal magnet travel parallel thereto. Such straight line pairs may be (a) mutually parallel and lying at right angles to the desired ideal path or (b) mutually parallel but both lying at the same non-right-angle to the said path or (c) not parallel and therefore lying at different angles to the said path, in which case preferably one of the two portions is at right angles to the path. The angle of intersection, if not a right angle in case (b) or (c) is preferably greater than that angle ever encountered as a club face angle deviation (for reasons discussed below), and is usually 30°–60° e.g. 45°.

The straight line pairs, of cases (a) (b) and (c), can if desired form different portions of a continuous loop, but of course can also be parts of separate loops. Such loops preferably include continuity portions, one at each end of the elongate portion and extending away from the said ends in the direction of the desired ideal path. If some other configuration is adopted e.g. to join the ends of the elongate portion by a semicircular connection, the signal detected will vary in dependence upon the point of crossing of the elongate portion. It may of course be possible to counteract this, but is is easier to manage the loop otherwise. Of course, if the elongate portion were very long, the effect of the orientation of the ongoing loop regions would be minimised, but this is also impractical, thus continuing portions in the ideal path direction are greatly to be preferred.

In practice of the invention it is envisaged to form the array of a plurality of loops at predetermined locations and orientation in relation to the ball position indication, the loops being electrically insulated from one another and collectively therefore permitting a multiplicity of separate signals to be detected and analysed or converted to a suitable form for measurement and/or display for each swing of the club. Preferably, such loops are of equal extension in the direction of magnet travel.

It is a preferred feature moreover to provide aligned sub-units of the elongate portion, each in different loops.

One such plurality of loops is of particular value for use with a club with magnets of opposed polarity, oriented with axes substantially in the travel direction and equispaced about the central plane of the club head at the back of the club, near the sole, at a separation x. In such a case the array of loops preferably comprises:

(a) three closely adjacent mutually aligned straight first portions of the detector array at right angles to the direction of the desired ideal path, all in separate conductive loops, constituting a central first portion of length less than x and itself symmetrically arranged about the desired ideal path, a further end first portion, and a nearer end first portion;

(b) two closely adjacent mutually aligned straight second portions of the detector array, in separate conductive loops, parallel to and coordinated with those first portions, of lengths equivalent to the said central first portion and the further end first portion, and at a known distance therefrom, and (c) two mutually parallel third portions of the detector array at 30° to 60° e.g 45° to the said first and second portions in separate conductive loops, at spacings intersecting with the further first, and corresponding second, end portions respectively at points over which the further magnet of the two magnets passes when the club passes along the desired ideal path over the central first portion.

Typically, loops (a) and (b) may be separated from loops (c) by a thickness of insulating material.

Another valuable plurality of loops is of particular value for use with a club with magnets oriented with axes vertical at right angles to the direction of travel, spaced apart at the sole of the club along the central plane of the club head. In such a case the array of loops preferably comprises (a) first parallel straight portions mutually spaced at a known distance and both at right angles to the desired ideal path and (b) second parallel straight portions at a non-right angle to those first portions and spaced to pass through the respective intersections of the two straight first portions and the desired ideal path.

The loops themselves may be composed of wire, possibly wound in a number of turns, or may be flat conductive ribbons of material or tracks on a printed circuit board. The actual width of the lines does not appear to be critical.

It is envisaged moreover that the loops of the array may include one or more additional compensating loops, of the same size as the loops providing magnetically induced signals, the function of which is to receive any extraneous external disturbance e.g the far-field signal from overhead power lines, and to provide a signal to neutralise and compensate for the same signal received in the induced signal loops.

Preferably the detector array is configured as a composite expanse comprising the loop or loops as discussed above, electrically insulated one from another and from their surroundings, the upper surface of which expanse shows the ball position indication. The expanse can be a more or less rigid, impact-resistant plate if configured for woods or irons, but can be less strong e.g. a flexible mat if only putting characteristics are to be measured. It is valuable if an area of low-reluctance magnetic material is located beneath the loops to enhance signal strength. The expanse could alternatively have a periphery to allow placement around a ball in play e.g. on a putting green, to record and analyse the putting swing.

The readout means of the apparatus for detection, measurement or display could simply comprise means providing an intersection signal, to give an audible or visible indication of a swing fault. More preferably it comprises means providing a digital or analogue readout, of one or more parameters, obtained by computation based upon combinations of signals received from the loop or the different loops. Such computation may be summarised on a display screen showing a notional golf hole, showing where the ball would have travelled if hit with the recorded and analysed swing.

The invention extends to the combination as defined either with a whole set of clubs, or a selected sub-set of clubs e.g. one wood, one iron (such as a 5-iron) and optionally one putter, all suitably provided with a magnet or magnets. The magnets can be differently arranged depending on the type of club.

Other aspects of the invention include a golf club head per se suitably provided with magnets as discussed above, and a mat comprising the detector array of loops also as discussed above.

The operation of the apparatus as defined above, in general terms, depends on the following considerations.

If a magnet moves past a magnet-sensitive sensor it induces an electric pulse.

The maximum strength of this pulse, assuming equal speeds of transit, varies with the minimum distance from the sensor. For a sensor of small dimension e.g. a small wound coil of wire, the maximum strength of the pulse falls off with the cube of the distance. For a lump of metal, with eddy currents induced by a magnet located at the sensor the fall-off is closer to the inverse sixth power. We have realised however that for an elongate sensor the pulse strength falls off approximately with the square of the distance, and that (having regard to the dimensions of golf clubs and the conventional ground clearance distances in play) magnets can be selected for incorporation to give improved sensitivities useful in diagnosing errors in swing characteristics. Moreover, we have established that the length of the pulse is essentially linearly dependent, for a given club speed, upon height i.e. minimum distance from the magnet to the sensor, but not upon magnet strength. Speed can readily be calculated, so that height can be easily and accurately established. In practice the magnets need not be calibrated and loss of magnetic field strength i.e. any demagnetisation does not affect the height determination.

If the magnet passes a linear pickup wire when travelling in its magnetic axis direction it will give a so-called "zero-cross" signal, i.e. one which increases to a maximum, thence goes rapidly to zero and equally rapidly to the same maximum in the other sense, and thereafter decreases again, to give a symmetrical pulse. The zero-cross point can be easily established, as can the heights of the maxima, and the time between maxima.

A magnet moving past such a wire at an angle (other than a right-angle) to its magnetic axis also gives a zero-cross signal, but one where one maximum is bigger than the other. The ratio between the maxima is measurable and can be related to the angle of travel relative to the magnetic axis.

A magnet moving past a wire in a direction at right angles to its magnetic axis gives a peak value rather than a zero-cross signal, although the peak may be accompanied by minor opposite values to either side.

It can thus be seen, in general terms, how the key characteristics of a golf swing can be detected or measured.

Speed of club can be assessed by timing the same portion of two successive pulses as the club-head travel intersects the line of two lengths of wire. Either a zero-cross signal or (less preferably) a peak signal could be used. Less accurately, one wire and two sole magnets at known separation could give two spaced pulses and hence, when these are timed, a speed indication.

Line of club head travel i.e. inswing or outswing can be established by causing the magnet to cross four lines, two parallel at right angles and two parallel at an inclination of e.g. 45°. The two right angle parallel lines give signals the time separation of which can be compared to that time separation of the signals generated at either of such parallel lines, and the inclined lines, to give an indication of the line of club travel.

Errors in angle of club face (i.e. as viewed from above) lead to one or other of two "heel and toe" magnets crossing a given line in advance, the signalled time separation in this case being a measure of "open" or "closed" angle.

Errors in vertical (tilt) angle of club face can be established by the measured shape of the zero-cross curves of, for example, the toe magnet located at the back of an iron with axis horizontal.

Errors in overall club height can be measured, as discussed above, after compensation for speed effects, by the zero-cross pulse width at one or other magnet.

Errors in club striking i.e. towards the toe or heel can be measured by signals indicating the pulse separation from two separate pickup lines intersecting at e.g. 45° on the line of magnet travel in the desired ideal shot.

Errors in rake can be established by comprising the comparative height of a toe and a heel magnet during transit over a single line.

Errors in club head trajectory, i.e. in shape of swing, can be established by height measurements on the same magnet at different parallel lines at known spacings.

The rate of change of any of the above quantities, especially acceleration or change in "open" or "closed" angle, can also be readily established by two measurements, as discussed above, taken at a known distance apart.

It will therefore be apparent that a suitable arrangement of loops and straight portions will give a variety of signals which can be interpreted and combined to give readout values.

BRIEF DESCRIPTION OF THE DRAWINGS

Two embodiments of the invention will now be described solely by way of example and with reference to the accompanying drawings in which.

DETAILED DESCRIPTION OF THE INVENTION

Figure 1:
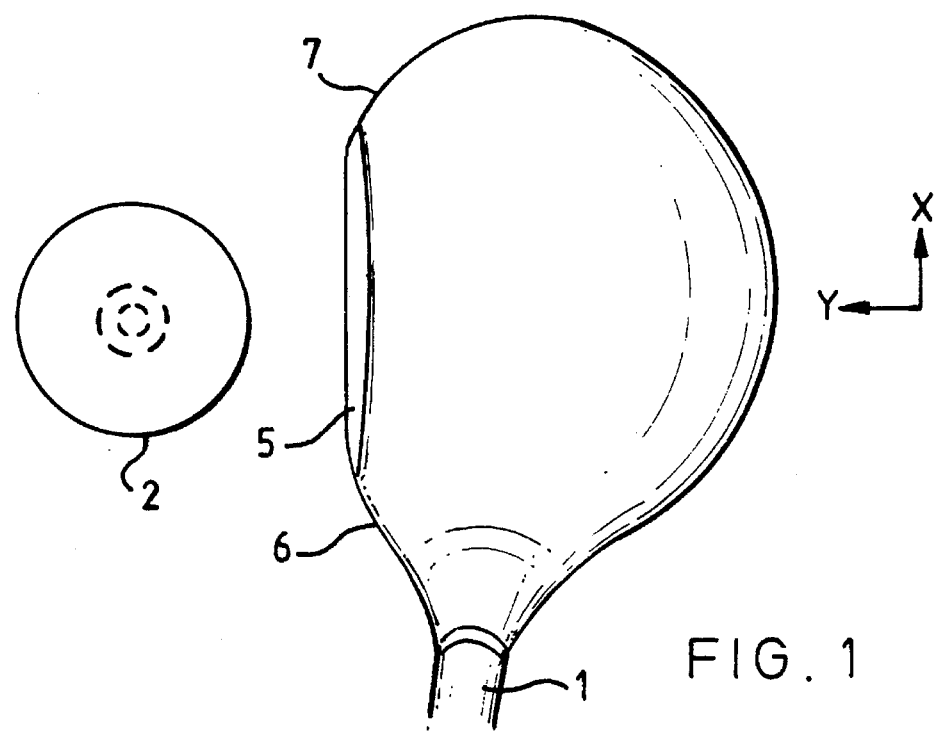
FIG. 1 is a top plan view of a clubhead and golf ball.
Figure 2:
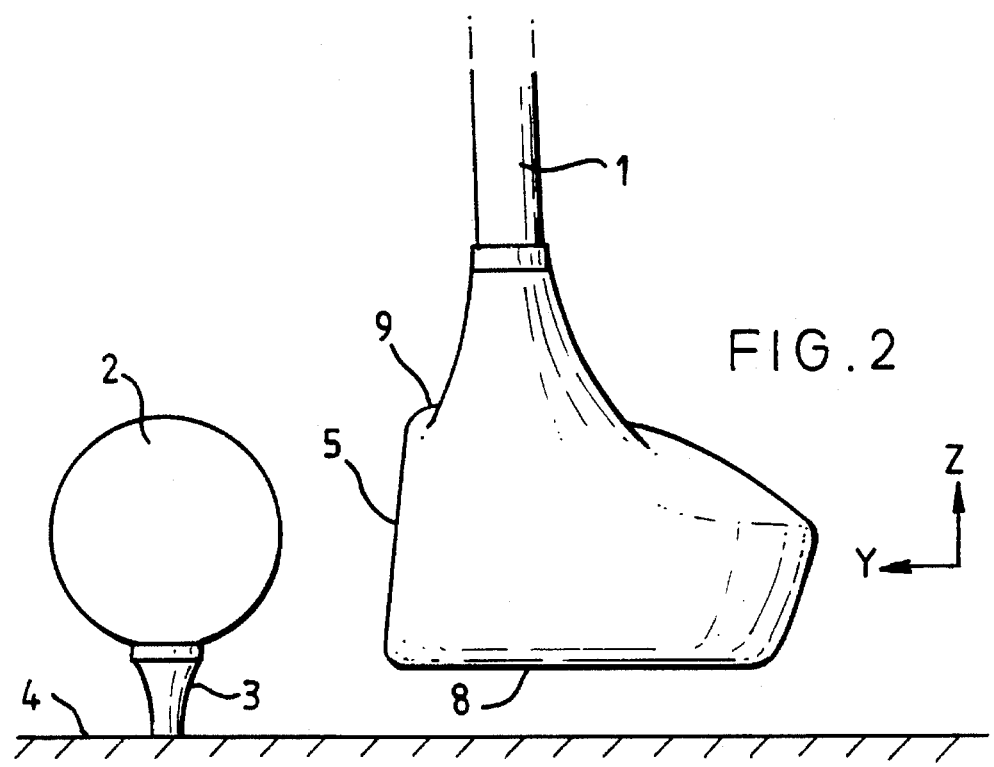
FIG. 2 is a side view of the clubhead and golf ball as shown in FIG. 1.

Cartesian coordinates X, Y and Z are shown in FIGS. 1 and 2 to specify directions. As can be seen from FIGS. 1 and 2, a golf club comprises a clubhead which is attached to a shaft 1. The shaft 1 is provided with a grip (not shown). The shaft 1 and the grip are used to swing the clubhead towards a golf ball 2, substantially in the Y direction. The golf ball 2 may initially rest on a tee 3 which supports the golf ball 2 slightly above ground level 4. Alternatively, the golf ball 2 may rest directly on the ground. In either case, the initial resting position of the golf ball 2 is referred to in this document as "tee position". The swingpath has a large radius of curvature and can be considered nearly linear over a short distance. A straight swingpath is characteristic of the clubhead motion near the impact region when its motion is substantially in the Y direction only but may also contain a component of motion in the Z direction.

On the clubhead, the correct golf ball striking surface is the clubface 5 which is a relatively flat surface extending from a heel 6 to a toe 7, the heel 6 and the toe 7 being those parts of the clubhead which also present a possible striking surface (during normal play) but are off the clubface 5 and thus are respectively close to and remote from the shaft 1. After impact of the clubhead with the golf ball 2, the flight of the golf ball 2 is determined by various factors including the clubhead swingpath and speed, the point of impact with the clubface 5, and the orientation of the clubface 5. A commonly preferred flight is one in which the golf ball travels mainly in the Y direction, with a lift component in the Z direction, and negligible movement (positive or negative) in the X direction. This is normally achieved when the swingpath is straight, the clubface 5 is square to the swingpath, and the point of impact with the golf ball 2 is at or near the centre of the clubface 5.

For the purpose of the following description, a straight swingpath and square and centred clubface are deemed to be optimum swing characteristics, and any deviations from these are classed as errors. It should be noted however, that intentional deviation from a straight swing path and square clubface are often used in golf technique. Errors in golf swing include "outswing", where the swingpath has a component of motion in the positive X direction, "inswing" where the swingpath has a component of motion in the negative X direction, "open clubface" where the clubface is rotated so as to face partly towards the positive X direction, "closed clubface" where the clubface is rotated so as to face partly towards the negative "X" direction, "toe offset" where the point of impact with the golf ball is off-centre and towards the toe, "heel offset" where the point of impact is off-centre and towards the heel, "bottom offset" where the point of the of impact is off-centre and towards the bottom of the club head, and top offset where the point of impact is off-centre and towards the top of the clubhead.

The clubhead shape used for illustration in FIGS. 1 and 2 is of the "driver" or "fairway wood" variety. The various features described above such for example as heel, toe etc and the golf swing parameters are applicable to other varieties of clubhead such for example as irons, wedges or putters.

One suitable sensor arrangement comprises a circuit loop which is laid flat at ground level in a region around the tee position, and a magnet attached to a clubhead having its magnetic axis substantially in line with the normal clubhead swingpath and thus approximately parallel to the plane of the circuit loop when the clubhead swings near the tee position.

Figure 3:
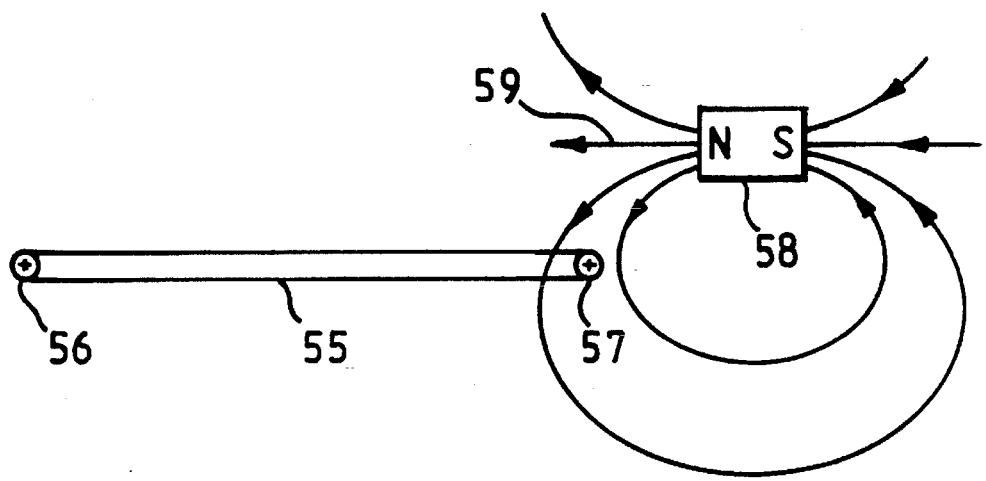
FIG. 3 shows a coil and magnet arrangement with the magnetic axis parallel to the plane of the coil.

This is illustrated with reference to FIG. 3 which shows a sectional view of a conductive wire loop 55 where the plane of the loop is normal to the page, and the wire sections 56, 57 are assumed to extend perpendicularly above and below the page. A magnet 58 in the plane of the page moves at constant speed above the loop in the direction shown by the arrow 59.

Figure 4:
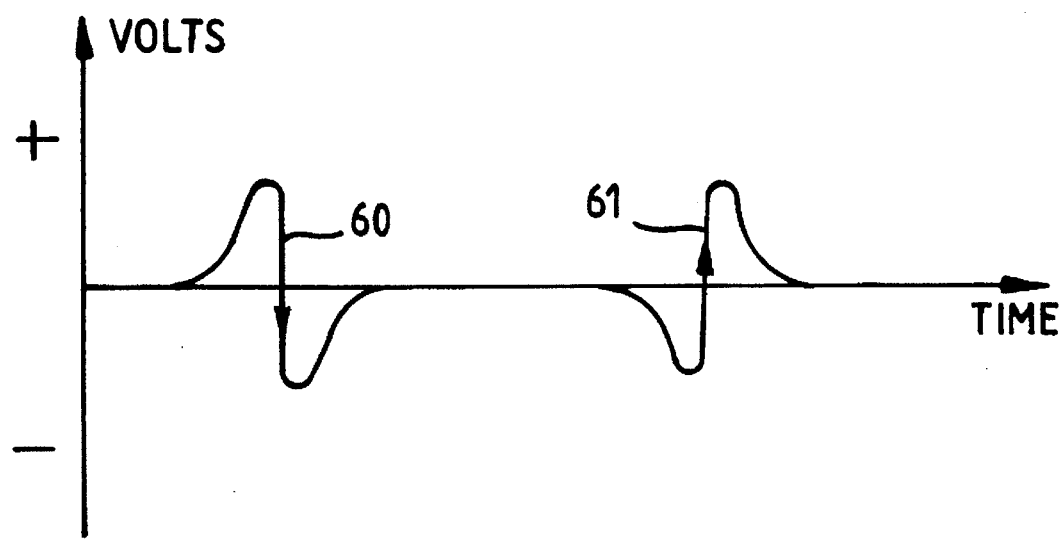
FIG. 4 shows a graph of the voltage induced in the coil shown in FIG. 3.

FIG. 4 shows the voltage waveform induced in the loop 55, the polarity of the waveform being arbitrary. The waveform in FIG. 4 exhibits two well defined zero-crossing points 60, 61, which are substantially coincident with the magnet 58 passing vertically above sections 57 and 56 of the coil 55. The sense of the zero-crossings (that is whether positive-going or negative-going) can be reversed by reversing the magnet's North and South poles.

Figure 5:
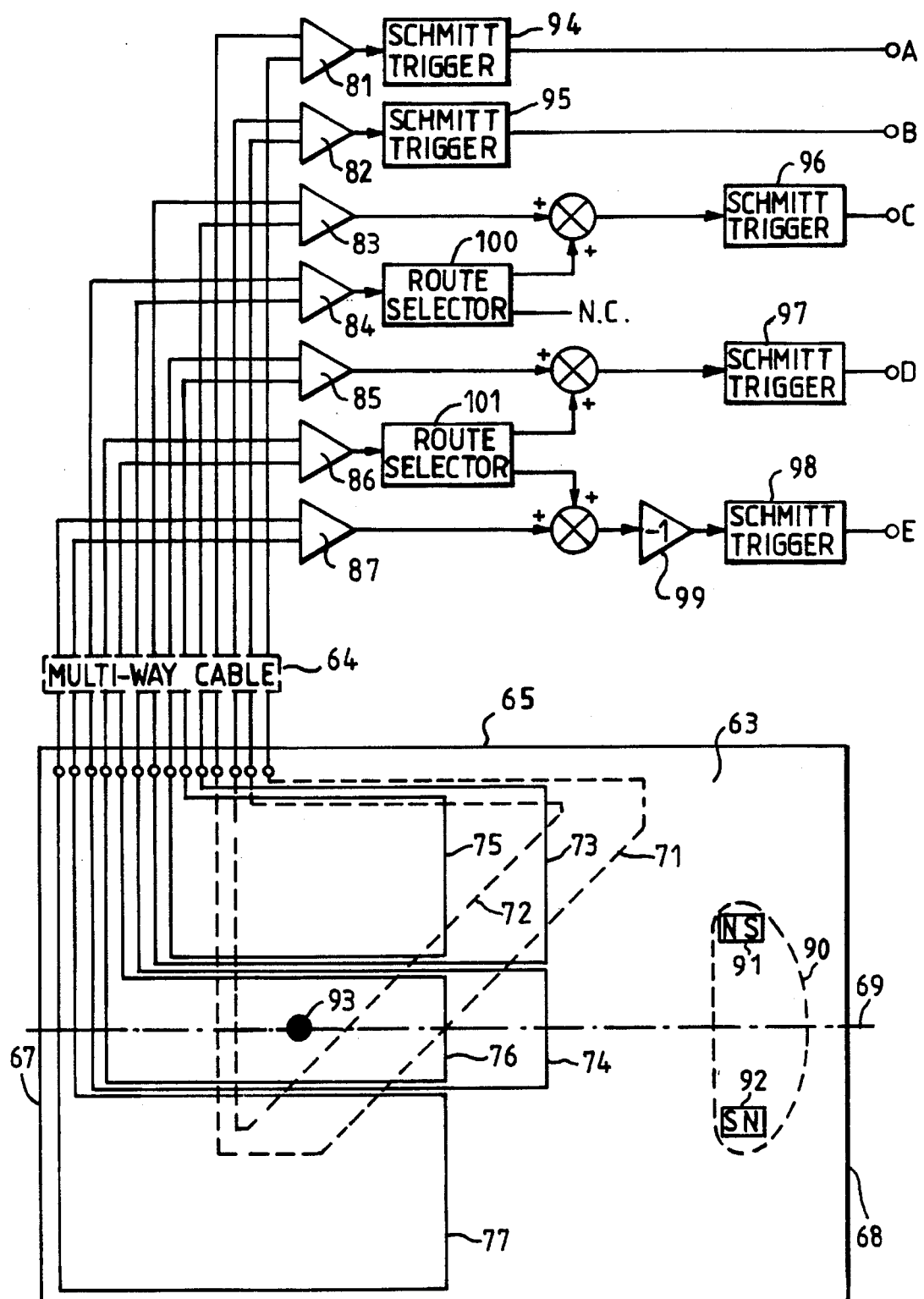
FIG. 5 shows first apparatus in accordance with the invention.

Referring now to FIG. 5, a sensor array comprising a number of loop circuits which are formed by tracks on a double sided printed circuit board 63, is connected via a multi-way cable 64 to amplifiers and signal detection circuits. For convenience, the printed circuit board is designated with a top edge 65, a bottom edge 66, a left hand edge 67, right hand edge 68 and a centre line 69. Two printed circuit tracks 71, 72 on the downward facing side of the printed circuit board each form a loop having one section of track sloping at nominally 45° to the centre line 69. The sloping sections of tracks 71 and 72 are substantially straight and parallel and extend some way on either side of the centre line, with "D" being the designated separation between the centres of the two tracks measured along the centre line. The ends of the loop formed by track 71 are connected to the inputs of an amplifier 81 via two wires in the multi-way cable 64. Similarly, the loop formed by track 72 is connected to an amplifier 82. Two printed circuit tracks 73, 74 on the upward facing side of the printed circuit board each form a rectangular loop, with the ends of the loops formed by the track 73 and the track 74 connected via extension tracks and the cable 64 to amplifiers 83, 84 respectively. One side of the rectangle formed by the track 73 is co-linear with one side of the rectangle formed by the track 74. The rectangle formed by and track 74 encloses an area which is approximately symmetric about the centre line. The rectangle formed by and track 73 is placed alongside and very close to the rectangle formed by the track 74, and encloses an area on the top part of the printed circuit board.

A further three rectangular loops are formed by tracks 75, 76 and 77 each of these having one mutually co-linear side which is substantially square to the centre line and aligned so as to be substantially in line with the point at which the track 71 crosses the centre line (viewed vertically). The separation between the co-linear segments of the tracks 73 and 74 and the co-linear segments of the tracks 75 and 76 is "D", as defined for the sloping segments of the tracks 71 and 72. The tracks 75 and 76 are inside the area bounded by tracks 73 and 74 respectively. The rectangle formed by the track 77 is placed alongside and very close to the rectangle formed by the track 74 and encloses an area on the bottom part of the printed circuit board. In general, the track widths and inter-track spacing are chosen so as to minimise the distances separating the co-linear segments at the corners of the rectangles, consistent with reliable manufacture and durability. The ends of the loops formed by the tracks 75, 76 and 77 are connected via extension tracks and the multi-way cable 64 to the inputs of amplifiers 85, 86 and 87 respectively.

In FIG. 5, the outline of a clubhead 90 is shown. Two magnets are attached to the clubhead, preferably by being embedded within the body of the clubhead. The magnets are typically cylindrical but may be of any convenient shape. A toe magnet 91 is positioned near the toe of the clubhead and a heel magnet 92 is positioned near the heel of the clubhead. The magnetic axes of both magnets are substantially parallel to each other and to the sole of the clubhead, and are aligned along the normal direction of swing. The line joining the centre of the magnets is substantially perpendicular to the magnetic axes, the centres being separated by a distance which is nominally twice "D". The polarity of the toe magnet is arbitrarily chosen with a North pole leading in the swing direction, and that of the heel magnet is reversed so that the South pole is leading.

For the case where the clubhead 90 and thus magnets 91, 92 are travelling at speed and slightly above the circuit loops, the first zero crossing points in each of the voltage signals induced in these circuit loops, mark the points in time when one or other of the magnets is substantially centred above a boundary marked out by the right hand edge of one or other of the circuit loops.

All seven channels, each comprising a circuit loop of the printed circuit board and an amplifier, are connected in the same sense so that the output signal polarities for a given input excitation are the same. During the execution of the golf swing which is nominally straight and with a square clubface centred on the ball position indication 93, the toe magnet 91 crosses above the boundaries formed by the tracks 71, 72, 73 and 75, and corresponding output signals in the amplifiers 81, 82, 83 and 85 are generated. The transition points, which are substantially coincident with the centre of the toe magnet crossing vertically above the said boundaries, are marked by the first positive going transitions in the outputs of Schmitt trigger circuits 94, 95, 96 and 97. The first positive going transition from each Schmitt trigger output is used to initiate timing and decoding routines in subsequent decoding electronics.

After passing beyond the tee position 93, either magnet may generate signals causing further output switching on the Schmitt triggers as the clubhead passes over circuit tracks in the left hand region of the printed circuit board. However, these secondary transitions are ignored by the signal processing electronics. It should be noted that the angle of the sloping boundaries (tracks 71 and 72) is chosen such that the initial transitions in these channels generated by the toe magnet is normally well advanced in time relative to secondary transitions generated by the heel magnet.

With a square clubface, the toe magnet 91 crosses the boundary formed by the track 75 at substantially the same instant that the heel magnet 92 crosses the boundary formed by the track 77. Since the field direction of the two magnets is reversed, the resultant polarity of the signal output from the amplifier 87 is inverted with respect to the signal output from the amplifier 85. The output from amplifier 87 is therefore fed to an inverting amplifier 99 prior to connection to the Schmitt trigger circuit 98. Thus the first positive transition in the output of the Schmitt trigger 98 marks the measured time for the heel magnet 92 passing vertically above the boundary formed by the track 77.

The heights of rectangles formed by the tracks 74 and 76 (measured along the bottom to top direction of the printed circuit board) are chosen to be somewhat smaller than the separation distance between the two magnets. As a consequence, when the swingpath is nearly straight and centred on the tee position, relatively little voltage is induced in the loops formed by the tracks 74 and 76, compared to the voltages induced in all the other loops. However, when the swingpath is off-centre such that one or other magnet passes over the tracks 74 and 76, voltages are induced in these loops with magnitudes comparable to the voltages induced in the off-centre loops. It is the purpose of the route selector circuit blocks 100, 101 to sense whether their input signals are characteristic of the heel magnet or the toe magnet generated signal (by sensing the signal polarity) and to route their input signals to appropriate summing Junctions. For example, when the toe magnet 91 passes over boundaries formed by the tracks 74 and 76, the output signal of the amplifier 84 is summed with the output signal of the amplifier 83, and the output signal of the amplifier 86 is summed with the output signal of the amplifier 85. In this manner, the swingpath can deviate to some degree on either side of the centre line 69, and the transitions associated with the heel and toe magnets crossing the various boundaries do not conflict. A wider extent of swingpath deviation can be accommodated by increasing the number of intermediate loops. In other words, this can be effected by replacing each of the loops formed by the tracks 74 and 76 with two or more loops over a wider central area, and by increasing the number of signal amplifiers and route selector circuits as appropriate.

A linear summation of the appropriate signals (as described above) is the preferred method of combining signals associated with the intermediate channels, but other techniques such as forming the logical OR of two or more transitions can be employed.

The output of the five Schmitt trigger circuits are labelled A, B, C, D and E (as shown in FIG. 5). In the following description, let tA, tB, tC, tD and tE be the instance in time during a golf swing corresponding to the first positive-going transition in outputs A, B, C, D and E respectively. Various golf swing parameters can be expressed as functions of these times and of the sensor array parameters D and $\theta$, where $\theta$ is the slant angle of the boundaries formed by the tracks 71 and 72, and is equal to 45° as shown in FIG. 5. Assuming that system and measurement errors are negligible, then the clubhead speed "S", clubhead swing angle o, clubface angle $\beta$ and clubface offset "X" can be expressed in simplified form as follows:

$$S = D/(tD - tC) \qquad (1)$$

$$\text{Phi} = K1 \left( \frac{tD - tC}{tB - tA} - 1 \right) \text{degrees} \qquad (2)$$

$$\beta = K2(tD - tE)/(tD - tC) \text{ degrees} \qquad (3)$$

$$X = D \cdot (tD - tB)/(tB - tA) \qquad (4)$$

$$\text{where} \quad K1 = 180/\pi$$
$$K2 = 90/\pi$$

It should be noted that the expression for offset, i.e. equation (4), is evaluated at the boundary formed by the tracks 75, 76 and 77 and is only correct at the tee position when the swing angle o is zero. If necessary, a further term can be included in equation (4) to adjust the offset obtaining at the tee position for finite values of swing angle.

Figure 6:
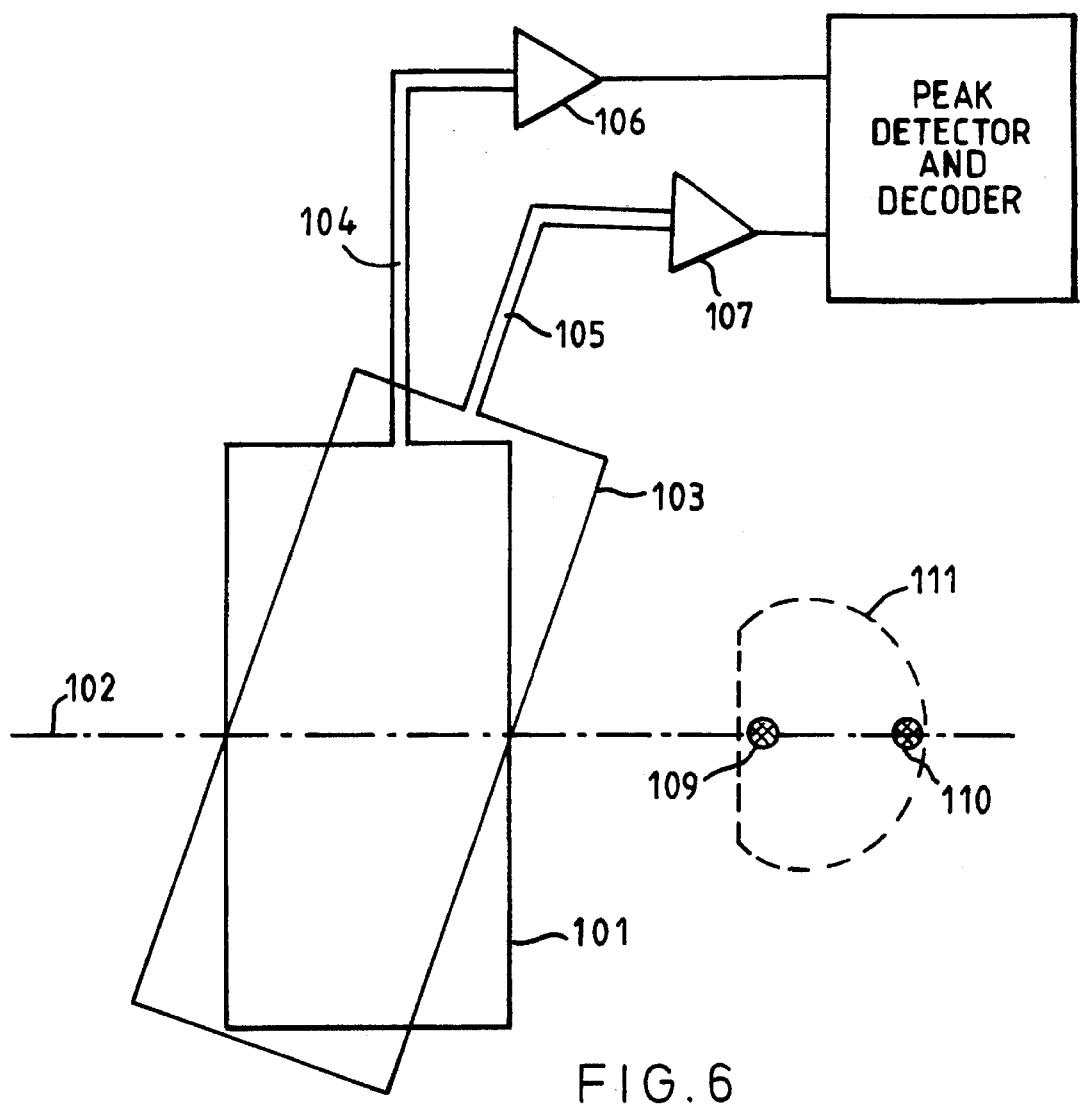
FIG. 6 shows second apparatus in accordance with the invention.

FIG. 6 shows an alternative embodiment of the invention. A rectangular circuit loop 101 has its longitudinal axis square to a centreline 102, and a second rectangular circuit loop 103 has its longitudinal axis slanting at some arbitrary angle to the centreline. The circuit loops 101, 103 are electrically isolated, but are shown diagrammatically as intersecting, with the intersect points both lying along the centreline. Both circuit loops lie flat at approximately ground level. Two wire pairs 104 and 105 connect the circuit loops 101 and 103 to amplifiers 106 and 107 respectively and the outputs of these amplifiers are fed to a peak detector and decoder block. A leading magnet 109 and a trailing magnet 110 are attached to a clubhead 111 shown in outline by dotted lines. The magnets are typically cylindrical and magnetized along their cylindrical axes. The magnets may be embedded into the sole of the clubhead such that their magnetic field axes lie along the normal line of swing and are substantially perpendicular to the sole of the golf club. The width of the circuit loops measured along the centreline 102 is designed to be appreciably different from the separation distance between the magnets (as, for example, in FIG. 6 where the circuit loop width is twice the distance between the magnet centres).

Figure 7:
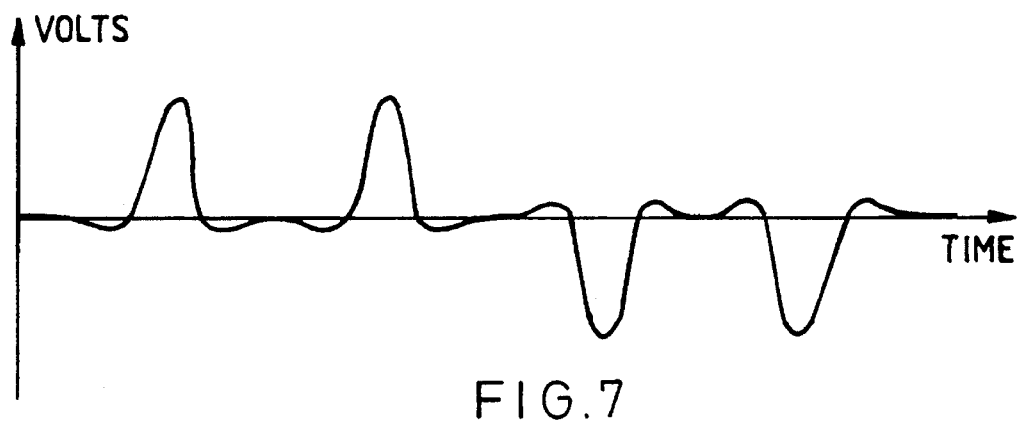
FIG. 7 shows a graph of a signal generated by the apparatus shown in FIG. 6.

FIG. 7 shows a typical output signal waveform at amplifier 106 in response to the clubhead (and thus the magnets) travelling at speed and slightly above the circuit loops. A similar signal waveform is obtained at amplifier 107, though in general the timing relationships of the various signal maxima and minima differ. It is noticeable that two minor peaks or "sidelobes" are associated with each major peak. The occurrence of the major maxima and minima coincide closely with the points in time when one or other of the magnets 109, 110 cross vertically above one or other of the four boundaries formed by the longer conductor sections in the circuit loop rectangles. The function of the peak detector and decoder block 108 is to detect the timing of the major maxima and minima in each of the amplifier output signals and to use the various timing relationships between these events to decode swing parameters of the golf club such as clubhead speed, swingpath angle, clubface angle and impact point.

Referring again to FIG. 5, it can be seen that in comparison to the arrangement of FIG. 6 a very small spacing between boundaries can be accommodated without loss of signal strength. This permits additional boundaries to be formed within a confined space close to the tee position. These additional boundaries may be used to obtain further data on the clubhead motion, for example the measurement of clubhead acceleration and the measurement of the rate of change of the clubface angle. These data can in turn be used to provide correction terms in the calculation of the other parameters, where factors such as acceleration introduce second order errors.

The amplitude and waveform shape of the signals generated in the various coils are affected by the vertical separation between the magnets and the coils. Thus additional data can be extracted from the signals relating to the height of the clubhead as it approaches the tee position. This makes it possible to estimate parameters in the vertical plane of the swing path, for example bottom offset or top offset.

Figure 8:
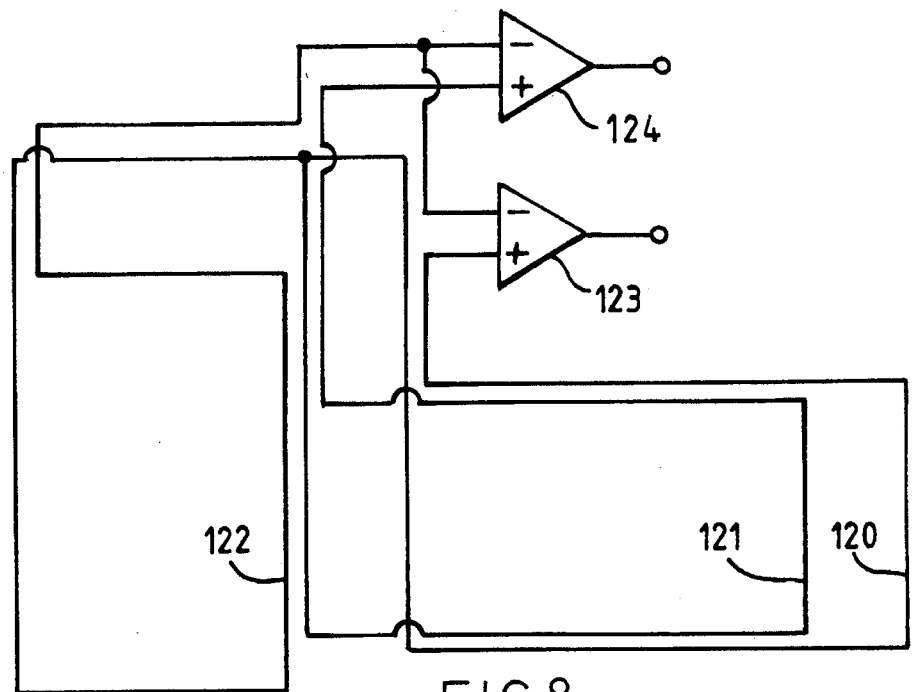
FIG. 8 shows alternative design features of part of the apparatus shown in FIG. 5.

Various enhancements can be added to the arrangement of FIG. 5 to improve accuracy or sensitivity. The finite size of the circuit loops give rise to slight timing errors relative to the exact instants when the magnets cross vertically above the various boundaries. The absolute timing errors at consecutive boundaries can be made equal (so that relative errors are zero) by the arrangement shown in FIG. 8 which shows only part of a full sensor array. In FIG. 8 the two sensing circuit loops 120, 121 are of nearly equal area and are overlapping. As a magnet crosses the boundaries formed by the right hand edges of the circuit loops 120, 121, timing errors occur whose magnitudes increase with increasing vertical distance of magnet swingpath away from the plane of the circuit loop. These absolute timing errors are substantially equal in the circuit loops 120 and 121 so that the time difference values, such as are used in equations (1) to (4) have negligible error. The effect of extraneous magnetic fields which may be produced for example by a.c. power cables can be cancelled to a great extent with the use of auxiliary circuit loops in the array. This is illustrated in FIG. 8 where the boundaries formed by the right hand edges of circuit loops 120, 121 are remote from an auxiliary circuit loop 122. All these circuit loops are of nearly the same area with the auxiliary circuit loop 122 connected in anti-phase with both other circuits such that extraneous magnetic fields which are substantially uniform over the entire array produce very little net signal interference at the inputs of the amplifiers 123, 124. Conversely, signals arising from the motion of a magnet over the sensor boundaries (right hand edges of circuit loops 120, 121) are not significantly altered. Further signal enhancement can be provided by inserting a material with low magnetic reluctance, typically in sheet form, below the sensor array. This increases the magnetic flux coupling into the circuit loops from the magnets, thus increasing signal strength, but does not affect the strength of far field magnetic interference normal to the array.

To function for a "left-handed" golf club which is swung from left to right, the array of sensor loops as depicted in FIG. 5 is turned over such that edge 68 becomes the left hand edge and edge 65 remains the top edge.

It is to be appreciated that other arrangements then those specifically described may be used in carrying out the invention so long as a magnet is attached to a golf clubhead and the magnetic field which moves with the clubhead can be sensed by magnetic field sensors having distributed or effectively distributed responses along various known boundaries which are fixed relative to the golf tee position. For example, Hall-effect devices or magneto-resistive devices may be used, possibly in conjunction with elements of low magnetic reluctance material to obtain the requisite distributed response along various boundaries. The sensors may be incorporated into a compliant substrate to simulate a turf playing surface. The sensor boundaries may exist at ground level or at any other convenient position. For example, sensors may be placed so as to detect a magnetic field generated sideways from the toe or heel of the clubhead. Where measurement of the clubface orientation is to be made, the said magnetic field may contain at least two geometrically separate and distinguishable magnetic field centres.

Figure 9:
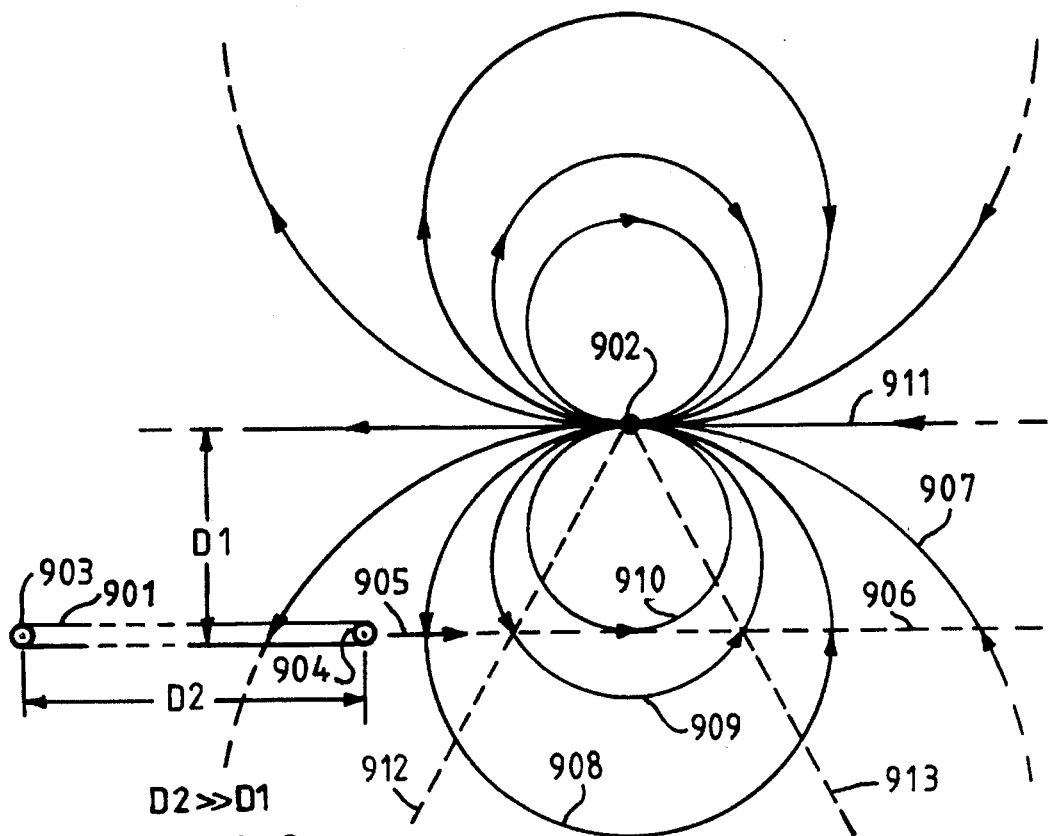
FIG. 9 is a diagram illustrating the magnetic field intersection with a linear conductor.

FIG. 9 illustrates (in two dimensions only) a loop circuit 901 and an ideal magnetic dipole 902 with its associated magnetic field pattern. The loop circuit is flat and is depicted as having straight line boundaries 903, 904 perpendicular to the page. In one non-limiting embodiment, the magnetic field pattern of magnets used in the invention is chosen to approximate closely to that of an ideal magnetic dipole.

The magnetic field is assumed to move at a fixed velocity relative to the circuit loop. For convenience, an arrow 905 indicates the direction of motion of the (actually stationary) circuit loop relative to the magnetic field, and a dotted line 906 shows the locus through the magnetic field which is cut by the circuit loop boundary 904. Hypothetical lines of magnetic flux 907, 908, 909, 910 are shown as eccentric circles all having a common tangent passing through the centre of the magnetic dipole 902. A straight line 911 depicts the special case where the hypothetic flux line has infinite radius. This line is the magnetic field axis and is parallel to the plane of the circuit loop 901 and to the direction of motion.

As the boundary 904 moves close to the field centre, an increasing portion of the total magnetic field is linked into the circuit loop, the field strength at the boundary 904 increases and the voltage induced in the circuit loop initially increases in magnitude. A circle 908 depicts the case where the magnetic field direction at the intersect with the boundary 904 is normal to the plane of the circuit loop, such that the total field component at that point is coupled into the circuit loop. By comparison, a circle 910 depicts the case where the magnetic field direction at the intersect with the boundary 904 is parallel to the plane of the circuit loop, such that the field component at that point is not linked by the circuit loop and the instantaneous induced voltage is zero. A circle 909 is intermediate to circles 908 and 910 and depicts the case where the magnetic field vector normal to the plane of the circuit loop at the boundary intersect is a maximum, such that the magnitude of the instantaneous induced voltage is also a maximum. The distance of the magnetic field axis 911 is assigned the label 'D1'. As D1 increases or decreases, the circles 908, 909 and 910 corresponding to the special cases described above increase or decrease their radii in linear proportion. For the particular case of the circle 909 whose points of intersection with the boundary 904 correspond with the maximum magnitudes of induced voltage in the circuit loop 901, it can be seen that the two dotted lines 912 and 913 form the loci of intersect points at which maximum positive and negative voltage induction occurs for all values of D1. It is thus evident that a measure of the distance separating the magnetic dipole and the plane of the circuit loop can be obtained if the relative velocity is known and the time separation between the positive and negative peaks in the induced signal is known.

Figure 10:
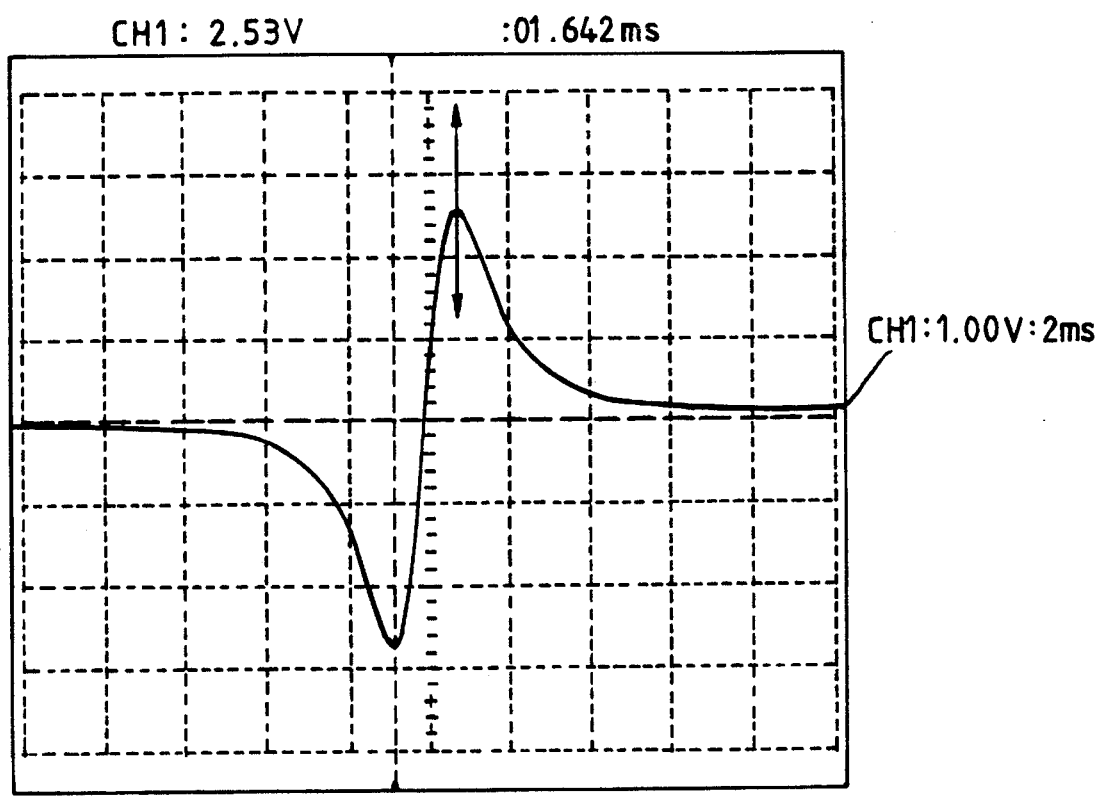
FIG. 10 shows a zero-cross signal as produced by the arrangement of FIG. 9.

FIG. 10 shows a copy of a waveform captured on a digital storage oscilloscope during an experiment to measure voltages induced in a circuit loop with an arrangement substantially equivalent to FIG. 9. The experiment confirmed that in practice the time separation between the positive and negative peaks is linearly proportional to the height of a magnet's line of travel above a circuit loop at a given velocity. The experiment also confirmed that the voltage magnitudes induced in a circuit loop (whose dimensions are large relative to the separation distance of the magnet), varies inversely as the square of the separation distance.

The height of a golf clubhead relative to a sensor mat can thus be determined either by the time relationship of the negative and positive peaks associated with a boundary crossing, or by the absolute magnitude of these peaks, taking into account the velocity of the clubhead. The former method has the advantage that the measurement is not sensitive to the magnet's field strength. Measurement at two or more locations along the swingpath allows the computation of the vertical trajectory of the clubhead as it impacts with the golf ball. Independent measurements of height for heel and toe magnets can be made to allow dynamic measurement of rake angle (i.e. the angle of tilt from heel to toe).

Further signal features can be decoded to determine the degree of vertical tilt in the swingpath direction. An upward tilt, such as may be imparted to a driver clubhead by centrifugal force during a swing, results in the leading voltage peak (i.e the negative peak in FIG. 10) having a smaller magnitude than that of the trailing voltage peak (i.e. the positive peak in FIG. 10). Conversely, a downward tilt, such as imparted in the execution of a "punch" stroke, where the effective clubface loft at impact is deliberately reduced, results in the magnitude of the leading voltage peak exceeding the magnitude of the trailing voltage peak.

I claim:

1. An apparatus for detecting a golf swing's deviations from desired ideal performance characteristics, comprising:
   (a) at least one golf club comprising a club head, said club head comprising a club face;
   (b) at least one permanent magnet attached to said club head at a predetermined location and orientation relative to said club face;
   (c) a detector array comprising a ball-position indication, said detector array further comprising at least one sensor for detecting a magnetic field and producing at least one electrical signal upon detecting said magnetic field, said sensor located in a fixed position relative to a notional line corresponding to the desired ideal path of said club head over said ball position indication, said sensor comprising a magnet-sensitive boundary unit comprising at least one elongate portion in a fixed location and orientation relative to said notional line;
   (d) circuitry electrically connected to said detector array for converting said electrical signals; and
   (e) readout means, connected to said circuitry, to provide an indication of detected differences between the actual path of said club head and said desired ideal path.

2. An apparatus as claimed in claim 1 wherein said elongate portion is a substantially straight segment.

3. An apparatus as claimed in claim 1 wherein said elongate portion is a substantially straight line segment of a loop of electrically conductive material.

4. An apparatus as claimed in claim 1 wherein said golf club further comprises a sole, a back, a central plane defined as the plane in which a hit golf ball will initially generally travel when struck by said club face and at least one recess in said golf club in said central plane perpendicular to said club face, one of said permanent magnets located in each of said recesses.

5. An apparatus as claimed in claim 4 wherein said recess is located in the sole of said golf club.

6. An apparatus as claimed in claim 4 wherein said recess is located in the back of said golf club.

7. An apparatus as claimed in claim 4, wherein two recesses are provided and said permanent magnets are oriented with opposed polarity.

8. An apparatus as claimed in claim 4 wherein two recesses are provided and said permanent magnets are spaced apart at a distance of about 50 mm to 90 mm.

9. An apparatus as claimed in claim 1 wherein said permanent magnets have magnetic axes and said magnetic axes are substantially vertical to said detector array when said club head swings over said ball-position indication.

10. A golf club as claimed in claim 9 wherein two permanent magnets are provided, said magnets being oriented in opposed plurality.

11. An apparatus as claimed in claim 1 wherein said permanent magnets have magnetic axes and said magnetic axes are horizontal to said detector array wherein said club head swings over said ball-position indication.

12. An apparatus as claimed in claim 1 wherein said golf club is wood.

13. An apparatus as claimed in claim 1 wherein said golf club is an iron.

14. An apparatus as claimed in claim 1 wherein said golf club is a putter.

15. An apparatus as claimed in claim 1 wherein said permanent magnets are of the rare-earth-based type.

16. An apparatus as claimed in claim 15 wherein said permanent magnets are of the NdFeB type.

17. An apparatus as claimed in claim 15 wherein said permanent magnets are of the $SECo_5$ type.

18. An apparatus as claimed in claim 1 wherein said permanent magnets have a cylindrical shape of about 5 to 10 mm diameter and 3 to 10 mm length, and a BH product of about 50 to 350 kilojoules per cubic meter.

19. An apparatus as claimed in claim 1 wherein said elongate portion of said detector array comprises at least one straight segment of electrically conductive material located and positioned to intersect the plane defined by said desired ideal path.

20. An apparatus as claimed in claim 1 wherein said detector array comprises at least two elongate portions which intersect the plane defined by said ideal path.

21. An apparatus as claimed in claim 20 wherein said elongate portions are parallel and perpendicular to said notional line.

22. An apparatus as claimed in claim 20 wherein said elongate portions are parallel and angled to said notional line.

23. An apparatus as claimed in claim 20 wherein said elongate portions are not parallel, and one of said elongate portions is perpendicular to said notional line.

24. An apparatus as claimed in claim 23 wherein the angle defined between said portions is between about 30° and 60°.

25. An apparatus as claimed in claim 23 wherein said elongate portions are segments of an equal number of continuous electrical loops.

26. An apparatus as claimed in claim 23 wherein said straight line segments are portions of separate electrical loops.

27. An apparatus as claimed in claim 1 wherein said detector array comprises at least one electrical loop comprising said elongate portion, said elongate portion having two ends, said loop continuing from said ends in the general direction of said notional line.

28. An apparatus as claimed in claim 1 wherein said detector array comprises a plurality of loops at predetermined locations and orientation in relation to said ball-position indication, said loops being electrically insulated from one another and collectively permitting at least two separate signals to be detected and convened for transmission to said readout means.

29. An apparatus as claimed in claim 28 wherein said loops are of about the same length in the direction of said notional line.

30. An apparatus as claimed in claim 28 wherein said elongate portion comprises a composite of aligned smaller length elongate portions of at least two different loops.

31. An apparatus as claimed in claim 28, wherein said golf club has a back, a side, a central plane defined as the initial plane in which a golf ball hit by said golf club will generally travel, wherein two of said permanent magnets are oriented with opposed polarity, said magnets having magnetic axes, said magnets being housed in said golf club and oriented with said axes substantially aligned yet spaced on both sides by a distance X from said central plane, wherein said detector array further comprises:

(a) three closely adjacent mutually aligned straight first elongate portions at right angles to said notional line, all of said elongate portions being segments of separate conductive loops, the middle of said loops being of elongate length less than X;

(b) two closely adjacent mutually aligned straight second elongate portions of separate conductive loops, parallel to and coordinated with said first elongate portions, of elongate lengths equivalent to the said first elongate portions; and (c) two mutually parallel third elongate portions at an angle between about 30° to 60° to the said first and second elongate portions, in separate conductive loops, at a spacing intersecting with the first and second elongate portions of two of said first elongate portions and one of said second elongate portions respectively at points over which the further of said permanent magnets passes when said golf club passes along said notional line over the central of said first elongate portions.

32. An apparatus as claimed in claim 31 wherein said detector array, comprised of loops of subparagraphs (a) and (b), are separated from loops of subparagraph (c) by a thickness of insulating material.

33. An apparatus as claimed in claim 28 wherein said golf club has a back, a side, an axis parallel to the direction in which the golf club will travel and a central plane being defined as the plane in which a hit ball will generally travel, wherein said permanent magnets have magnet axes, the magnets being oriented with said axes vertical and at right angles to said direction of golf club travel during swinging, said permanent magnets being spaced apart at the sole of said golf club along said central plane, and in which said elongate portions of said detector array further comprise (a) first parallel straight segments spaced at a known distance and at right angles to said notional line and crossing said notional line at respective intersections and (b) second parallel straight segments at an angle to those first parallel straight segments and oriented to pass through said respective intersections.

34. An apparatus as claimed in claim 1 wherein said detector array comprises loops which are composed of wire or flat conductive ribbon.

35. An apparatus as claimed in claim 1 wherein said detector array comprises loops formed as tracks on a printed circuit board.

36. An apparatus as claimed in claim 1 wherein said detector array comprises induced signal loops providing magnetically induced signals in response to movement of said golf club generally over said detector array and one or more additional compensating loops, of substantially the same size as said induced signal loops, said compensating loops serving to receive extraneous external electrical disturbances and provide a signal to neutralize and compensate for the same in the said induced signal loops.

37. An apparatus as claimed in claim 1 wherein said detector array comprises a composite expanse of loops electrically insulated from one another and from the surroundings, the upper surface of said detector array having said ball-position indication.

38. An apparatus as claimed in claim 37 wherein said expanse comprises a rigid, impact resistant plate.

39. An apparatus as claimed in claim 37 wherein said expanse comprises a flexible mat.

40. An apparatus as claimed in claim 37 wherein said expanse has a periphery to allow placement around a golf ball standing in play.

41. An apparatus as claimed in claim 37 wherein low reluctance magnetic material means is located beneath said loops to enhance signal strength.

42. An apparatus as claimed in claim 1 wherein said readout means comprises display means providing an audible indication of deviation of a swing from said desired ideal path.

43. An apparatus as claimed in claim 1 wherein said readout means comprises display means providing a visual indication of deviation of a swing from said desired ideal path.

44. An apparatus as claimed in claim 1 wherein said detector array comprises at least one loop for providing magnetically induced signals and wherein said readout means comprises display means for providing display of at least one parameter obtained by computation based upon signals received from said loops.

45. An apparatus as claimed in claim 44 wherein said display means is digital.

46. An apparatus as claimed in claim 44 wherein said display means is analog.

47. An apparatus as claimed in claim 1 wherein said readout means includes a display screen showing a notional golf hole for display of a calculated representation of the travel of the notional ball hit with the recorded and analyzed golf swing.

48. An apparatus as claimed in claim 1 further comprising a full set of golf clubs provided with said permanent magnets.

49. An apparatus as claimed in claim 1 comprising a selected sub-set of golf clubs including at least one wood and at least one iron, each provided with said permanent magnets.

50. An apparatus as claimed in claim 49 wherein the selected sub-set of clubs further includes a putter.

51. An apparatus according to claim 1, wherein movement of said golf club along said desired ideal path creates a movement of magnetic flux with respect to said detector array, said boundary unit being such that it intersects at least 50% of the theoretical maximum amount of said flux.

52. An apparatus according to claim 1 wherein said detector array comprises a loop having a length extending along said ideal path, the height of said ideal path, above said loop, being small compared to said length of said loop along said ideal path.

53. A mat for detecting a golf swing's deviations from desired ideal performance characteristics, comprising:

a ball support surface;

a ball position indication on said ball support surface;

a detector array of electrical loops at predetermined locations and orientation in relation to said ball position indication;

said loops being electrically insulated from one another and collectively permitting at least two separate signals to be detected by movement relative to said ball position indication of a golf club having a permanent magnet attached thereto at a predetermined location and orientation;

each of said loops further comprising a magnet-sensitive boundary unit comprising at least one elongate portion in a fixed location and orientation to said ball position indication; and signal transmission means for transmitting said electrical signals to a readout device.

* * * * *